United States Patent
Jung et al.

(12)

(10) Patent No.: US 6,221,981 B1
(45) Date of Patent: Apr. 24, 2001

(54) METHOD FOR MAKING AND USING A SUPPORTED METALLCENE CATALYST SYSTEM

(75) Inventors: Michael Jung; Helmut G. Alt, both of Bayreuth (DE); Bryan E. Hauger, Claremore, OK (US); M. Bruce Welch, Bartlesville, OK (US); David W. Dockter, Bartlesville, OK (US); Syriac J. Palackal, Bartlesville, OK (US); Antoni Jurkiewicz, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/152,652

(22) Filed: Sep. 14, 1998

(51) Int. Cl.$^7$ ................................. C08F 4/44; C08F 2/01
(52) U.S. Cl. .............................. 526/64; 526/75; 526/160; 526/943; 526/352; 502/117; 502/153
(58) Field of Search ..................................... 526/160, 943, 526/352, 64, 75; 502/102, 104, 117; 556/53

(56) References Cited

U.S. PATENT DOCUMENTS

| 5,498,581 | * | 3/1996 | Welch et al. | 502/102 |
| 5,753,785 | | 5/1998 | Reddy et al. | 526/75 |

FOREIGN PATENT DOCUMENTS

WO 97/06951   2/1997   (WO) .

* cited by examiner

*Primary Examiner*—David W. Wu
*Assistant Examiner*—R. Harlan
(74) *Attorney, Agent, or Firm*—Edward L. Bowman

(57) ABSTRACT

Methods are disclosed for preparing a highly active solid metallocene-containing catalyst system and its use in the polymerization of olefins. The catalyst system is prepared by creating a catalyst system solution by combining an aluminoxane with a metallocene having a substituent which has olefinic unsaturation in a suitable liquid to form a liquid catalyst system, conducting prepolymerization of an olefin in the liquid catalyst system, and separating the resulting solid metallocene-containing catalyst system from the reaction mixture. Also polymerization of olefins using the inventive solid catalyst system is disclosed.

11 Claims, No Drawings

METHOD FOR MAKING AND USING A SUPPORTED METALLCENE CATALYST SYSTEM

FIELD OF THE INVENTION

This invention relates to a new type of solid particulate metallocene catalyst system useful for the polymerization and/or copolymerization of olefins. The invention is also related to a process for conducting polymerization of olefins using the inventive solid metallocene catalyst system and to the polymers and films produced thereby.

BACKGROUND OF THE INVENTION

The term "Metallocene" as used herein refers to a derivative of cyclopentadienylidene which is a metal derivative containing at least one cyclopentadienyl component which is bonded to a transition metal. The transition metal is selected from Groups IVB, VB, and VIB, preferably IVB and VIB. Examples include titanium, zirconium, hafnium, chromium, and vanadium. A number of metallocenes have been found to be useful for the polymerization of olefins. Generally, the more preferred catalysts are metallocenes of Zr, Hf, or Ti.

Generally, in order to obtain the highest activity from metallocene catalysts, it has been necessary to use them with an organoaluminoxane cocatalyst, such as methylaluminoxane. This resulting catalyst system is generally referred to as a homogenous catalyst system since at least part of the metallocene or the organoaluminoxane is in solution in the polymerization media. These homogenous catalysts systems have the disadvantage that when they are used under slurry polymerization conditions, they produce polymer which sticks to reactor walls during the polymerization process and/or polymer having small particle size and low bulk density which limits the commercial utility.

Some attempts to overcome the disadvantages of the homogenous metallocene catalyst systems are disclosed in U.S. Pat. Nos. 5,240,894; 4,871,705; and 5,106,804. Typically, these procedures have involved the prepolymerization of the metallocene aluminoxane catalyst system either in the presence of or in the absence of a support. An evaluation of these techniques has revealed that there is still room for improvement, particularly when the catalyst is one which is to be used in a slurry type polymerization where the object is to produce a slurry of insoluble particles of the end product polymer rather than a solution of polymer which could result in fouling of the reactor. In the operation of a slurry polymerization in a continuous loop reactor it is extremely important for efficient operations to limit polymer fouling of the internal surfaces of the reactor. The term "fouling" as used herein refers to polymer buildup on the surfaces inside the reactor.

U.S. Pat. No. 5,498,581 discloses a technique for producing insoluble polymerization catalysts by combining a metallocene having polymerizable groups with an aluminoxane and a particulate solid and then prepolymerizing. PCT /US96/13000, the disclosure of which is incorporated herein by reference, and a commonly owned copending application disclose that at least one such catalyst is capable of producing polyethylenes having ethyl branches which are uniformly distributed at the intra and intermolecular level without using any comonomer.

An object of the present invention is to provide a method for producing an insoluble polymerization catalyst that is capable of producing even more ethyl branches without the addition of comonomer. Another object of the present invention is to provide a process for producing polyethylene having unusually high levels of ethyl branches without the use of a comonomer. Still another object of the present invention is to provide polyethylenes that are particularly useful for making films of unusual clarity at a given density, said polyethylenes having a very narrow molecular weight distribution and no detectable amounts of long chain branching.

Another object of the present invention is to provide polyethylene having ethyl branches wherein the level of ethyl branches is substantially the same regardless of the molecular weight of the polymer molecules.

Another object of the present invention is to provide certain types of polyethylene having ethyl branches wherein the molar percent of ethyl branches is substantially the same for molecular fractions across the molecular weight distribution of the polymer. One type of such polyethylene is substantially free of any other type branches. In a preferred embodiment the polyethylene is substantially free of branches having 6 or more carbon atoms.

Another object of the present invention is to provide certain polyethylene having significant amounts of terminal vinyl groups, a very narrow molecular weight distribution, and a lower density than one would normally expect for the amount of branching due to comonomer insertions in the polymer chains.

Another object of this invention is to provide certain narrow molecular weight polyethylenes having an unusually low density for the amount of short chain branching at a given molecular weight. Still another object is to provide polyethylene films having a desirable combination of properties.

SUMMARY OF THE INVENTION

In accordance with the present invention, a solid particulate metallocene-containing catalyst system is produced by (a) combining an organoaluminoxane and at least one bridged metallocene having an indenyl radical bonded to a fluorenyl radical by a bridging group having at least one olefinic unsaturated substituent in a liquid to form a liquid catalyst system, (b) conducting prepolymerization of at least one olefin in the presence of said liquid catalyst system, to produce a prepolymerized solid catalyst, and (c) separating the resulting solid from the liquid and the components dissolved in the liquid, said solid being the solid particulate metallocene catalyst system. The phrase "liquid catalyst system" as used herein refers to the combination of the aluminoxane, the metallocene, and the liquid, irrespective of whether the aluminoxane and/or the metallocene are dissolved in the liquid.

In accordance with another aspect of the present invention, the resulting inventive solid particulate metallocene-containing catalyst system is employed in the polymerization of an olefin by contacting the olefin with the inventive solid particulate metallocene-containing catalyst system under suitable reaction conditions. In a particularly preferred embodiment the polymerization is conducted in the absence of any comonomer. In accordance with yet another aspect of the present invention there is provided a polymer of ethylene having uniformly distributed ethyl branches and no significant amounts of other branches. In accordance with another aspect there is provided unique films produced from polymers of ethylene having uniformly distributed ethyl branches and no significant amounts of other branches.

DETAILED DESCRIPTION OF THE INVENTION

The metallocenes contemplated as useful for the present invention include those represented by the formula (In)R (Fl)MeQ$_k$ wherein (In) and (Fl) are bound to Me and (In) is a substituted or unsubstituted indenyl radical and (Fl) is a substituted or unsubstituted fluorenyl radical; R is a structural bridge linking (In) and (Fl) and Me is a metal selected from the group consisting of III, IVB, VB, and VIB metals of the periodic table or lanthanides or actinides, each Q is the same or different and is selected from the group consisting of hydrogen, halogens, and organo radicals; k is a number sufficient to fill out the remaining valances of Me; further characterized by the fact that the bridge R contains at least one olefinically unsaturated substituent as a branch on the bridging unit.

A particularly preferred type of bridged metallocene includes those in which the olefinically unsaturated substituent on the bridge R has the formula

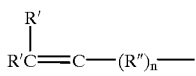

wherein R" is a hydrocarbyl diradical having 1 to 20 carbon atoms; more preferably 2 to 10; n is 1 or 0, and each R' is individually selected from the group consisting of organo radicals having 1 to 10 carbon atoms and hydrogen. Most preferably R" has at least two carbons in its main alkylene chain, i.e. it is a divalent ethylene radical or a higher homolog thereof.

Some olefinic branched bridged ligands useful for making metallocenes suitable for the present invention can be prepared by reacting a dihalo olefinic compound with an alkali metal salt of a suitable cyclopentadiene-type compound to produce a compound of the formula Fl-R-X wherein X is a halogen and then reacting that compound with an alkali metal salt of an indenyl compound to produce a compound of the formula Fl-R-In. Such reactions can be carried out using conditions of the type disclosed in U.S. Pat. No. 5,191,132.

The present invention thus envisions using bridged metallocenes prepared from vinyl terminated branched bridged ligands of the formula

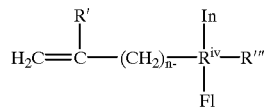

wherein n is a number typically in the range of about 0 to 20; more preferably 2–10; R$^{iv}$ is Si, Ge, C, or Sn; R"' and R' are each individually selected from hydrogen, or organo groups having 1 to 10 carbons. Currently preferred R' and R"' components are hydrogen or alkyl groups typically having 1 to 10 carbon atoms, or aryl groups typically having 6 to 10 carbon atoms and In is a substituted or unsubstituted indenyl radical and Fl is a substituted or unsubstituted fluorenyl radical. Preferably any substituents on In or Fl are hydrocarbyl radicals preferably containing 1 to 10 carbon atoms, with alkyl or alkenyl substituents being particularly preferred.

The metallocenes of such olefinically unsaturated branched-bridged ligands can be prepared by reacting the olefinically branched-bridged bis(cyclopentadienyl-type) ligand with an alkali metal alkyl to produce a divalent ligand salt that is then reacted with the transition metal compound to yield the metallocene, using the techniques generally known in the art for forming such metallocenes. See, for example, the technique disclosed in European Published Application 524,624, the disclosure of which is incorporated herein by reference.

A particularly preferred class of metallocenes containing a substituent having olefinic unsaturation are the metallocenes of 5-(1-indenyl)-5-(9-fluorenyl)-1-hexene, which is also sometimes referred to as 1-(9-fluorenyl)-1-(1-indenyl)-1-(methyl)-1-(but-3-enyl) methane.

The organo aluminoxane component used in preparing the inventive solid catalyst system is an oligomeric aluminum compound having repeating units of the formula

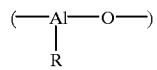

Some examples are often represented by the general formula (R-Al-O)$_n$, or R(R-Al-O-)$_n$AlR$^2$. In the general aluminoxane formula R is a C$_1$,–C$_5$ alkyl radical, for example, methyl, ethyl, propyl, butyl or pentyl and "n" is an integer from 1 to about 50. Most preferably, R is methyl and "n" is at least 4. Aluminoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally the reaction of an aluminum alkyl with a limited amount of water is postulated to yield a mixture of the linear and cyclic species of the aluminoxane.

In the first step of the present invention, the metallocene and aluminoxane are combined in the presence of a suitable liquid to form a liquid catalyst system. It is preferred that the liquid catalyst system be prepared using an organic liquid in which the aluminoxane is at least partially soluble. The currently preferred liquids are hydrocarbons such as hexane or toluene. Typically some aromatic liquid solvent is employed. Examples include benzene, toluene, ethylbenzene, diethylbenzene, and the like. The amount of liquid to be employed is not particularly critical. Nevertheless, the amount should preferably be such as to dissolve the product of the reaction between the metallocene and the aluminoxane, provide desirable polymerization viscosity for the prepolymerization, and to permit good mixing. The temperature is preferably kept below that which would cause the metallocene to decompose. Typically the temperature would be in the range of –50° C. to 100° C. Preferably, the metallocene, the aluminoxane, and the liquid diluent are combined at room temperature, i.e. around 10 to 30° C. The reaction between the aluminoxane and the metallocene is relatively rapid. The reaction rate can vary depending upon the ligands of the metallocene. It is generally desired that they be contacted for at least about a minute to about 5 hours, more preferably about 1 minute to 1 hour.

It is within the scope of the invention to form the liquid catalyst system in the presence of a particulate solid. Any number of particulate solids can be employed as the particulate solid. Typically the support can be any organic or inorganic solid that does not interfere with the desired end result. Examples include porous supports such as talc, inorganic oxides, and resinous support materials such as particulate polyolefins. Examples of inorganic oxide materials include Groups II, III, IV or V metal oxides such as silica, alumina, silica-alumina, and mixtures thereof. Other examples of inorganic oxides are magnesia, titania, zirconia, and the like. Other suitable support materials which can be employed include such as, magnesium dichloride, and finely divided polyolefins, such as polyethylene. It is within the scope of the present invention to use a mixture of one or more of the particulate solids.

It is generally desirable for the solid to be thoroughly dehydrated prior to use, preferably it is dehydrated so as to contain less than 1% loss on ignition. Thermal dehydration treatment may be carried out in vacuum or while purging with a dry inert gas such as nitrogen at a temperature of about 20° C. to about 1000° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

Dehydration can also be accomplished by subjecting the solid to a chemical treatment in order to remove water and reduce the concentration of surface hydroxyl groups. Chemical treatment is generally capable of converting substantially all water and hydroxyl groups in the oxide surface to relatively inert species. Useful chemical agents are for example, trimethylaluminum, ethyl magnesium chloride, chlorosilanes such as $SiCl_4$, disilazane, trimethylchlorosilane, dimethylaminotrimethylsilane and the like.

The chemical dehydration can be accomplished by slurrying the inorganic particulate material such as, for example silica, in an inert low boiling hydrocarbon, such as for example, hexane. During the chemical dehydration treatment, the silica should be maintained in a moisture and oxygen free atmosphere. To the silica slurry is then added a low boiling inert hydrocarbon solution of the chemical dehydrating agent, such as, for example dichloroldimethylsilane. The solution is added slowly to the slurry. The temperature ranges during chemical dehydration reaction can be from about 20° C. to about 120° C., however, higher and lower temperatures can be employed. Preferably, the temperature will be about 50° C. to about 100° C. The chemical dehydration procedure should be allowed to proceed until all the substantially reactive groups are removed from the particulate support material as indicated by cessation of gas evolution. Normally, the chemical dehydration reaction will be allowed to proceed from about 30 minutes to about 16 hours, preferably, 1 to 5 hours. Upon completion of the chemical dehydration, the solid particulate material may be filtered under a nitrogen atmosphere and washed one or more times with a dry, oxygen free inert solvent. The wash solvents as well as the diluents employed to form the slurry and the solution of chemical dehydrating agent, can be any suitable inert hydrocarbon. Illustrative of such hydrocarbons are pentane, heptane, hexane, toluene, isopentane and the like.

Another chemical treatment that can be used on solid inorganic oxides such as silica involves reduction by contacting the solid with carbon monoxide at an elevated temperature sufficient to convert substantially all the water and hydroxyl groups to relatively inactive species.

The specific particle size of the support or inorganic oxide, surface area, pore volume, and number of hydroxyl groups is not considered critical to its utility in the practice of this invention. However, such characteristics often determine the amount of support to be employed in preparing the catalyst compositions, as well as affecting the particle morphology of polymers formed. The characteristics of the carrier or support must therefore be taken into consideration in choosing the same for use in the particular invention.

It is also within the scope of the present invention to add such a particulate solid to the liquid catalyst system after it has been formed and to carry out the prepolymerization in the presence of that solid.

The amount of aluminoxane and metallocene used in forming the liquid catalyst system for the prepolymerization can vary over a wide range. Typically, however, the molar ratio of aluminum in the aluminoxane to transition metal of the metallocene is in the range of about 1:1 to about 20,000:1, more preferably, a molar ratio of about 50:1 to about 2000:1 is used. If a particulate solid, i.e. silica, is used generally it is used in an amount such that the weight ratio of the metallocene to the particulate solid is in the range of about 0.00001/1 to 1/1, more preferably 0.0005/1 to 0.2/1.

The prepolymerization is conducted in the liquid catalyst system, which can be a solution, a slurry, or a gel in a liquid. A wide range of olefins can be used for the prepolymerization. Typically, the prepolymerization will be conducted using an olefin, preferably selected from ethylene and non-aromatic alpha-olefins, such as propylene. It is within the scope of the invention to use a mixture of olefins, for example, ethylene and a higher alpha olefin can be used for the prepolymerization. The use of, a higher alpha olefin, such as 1-butene, with ethylene is believed to increase the amount of copolymerization occurring between the olefin monomer and the olefinically unsaturated portion of the metallocene.

The prepolymerization can be conducted under relatively mild conditions. Typically, this would involve using low pressures of the olefin and relatively low temperatures designed to prevent site decomposition resulting from high concentrations of localized heat. The prepolymerization typically occurs at temperatures in the range of about −15° C. to about +110° C., more preferably in the range of about 0 to about +30° C. The amount of prepolymer can be varied but typically would be in the range of from about 1 to about 95 wt % of the resulting prepolymerized solid catalyst system, more preferably about 5 to 80 wt %. It is generally desirable to carry out the prepolymerization to at least a point where substantially all of the metallocene is in the solid rather than in the liquid since that maximizes the use of the metallocene.

After the prepolymerization, the resulting solid prepolymerized catalyst is separated from the liquid of the reaction mixture. Various techniques known in the art can be used for carrying out this step. For example, the material could be separated by filtration, decantation, or by vacuum evaporation. It is currently preferred, however, not to rely upon vacuum evaporation since it is considered desirable to remove substantially all of the soluble components in the liquid reaction product of the prepolymerization from the resulting solid prepolymerized catalyst before it is stored or used for subsequent polymerization. After separating the solid from the liquid, the resulting solid is preferably washed with a hydrocarbon and then dried using high vacuum to remove substantially all the liquids and other volatile components that might still be associated with the solid. The vacuum drying is preferably carried out under relatively mild conditions, i.e. temperatures below 100° C. More typically the prepolymerized solid is dried by subjection to a high vacuum at a temperature of about 30° C. until a substantially constant weight is achieved. A preferred technique employs at least one initial wash with an aromatic hydrocarbon, such as toluene, followed by a wash with a paraffinic hydrocarbon, such as hexane, and then vacuum drying.

It is within the scope of the present invention to contact the prepolymerization reaction mixture product with a liquid in which the prepolymer is sparingly soluble, i.e. a counter-solvent for the prepolymer, to help cause soluble prepolymer to precipitate from the solution. Such a liquid is also useful for the subsequent washing of the prepolymerized solid.

It is also within the scope of the present invention to add a particulate solid of the type aforementioned after the prepolymerization. Thus one can add the solid to the liquid prepolymerization product before the countersolvent is added. In this manner soluble prepolymer tends to precipitate onto the surface of the solid to aid in the recovery of the filtrate in a particulate form and to prevent agglomeration during drying. The liquid mixture resulting from the prepolymerization or the inventive solid prepolymerized catalyst can be subjected to sonification to help break up particles if desired.

Further, if desired the recovered solid prepolymerized catalyst system can be screened to give particles having sizes that meet the particular needs for a particular type of polymerization.

Another option is to combine the recovered inventive solid prepolymerized catalyst system with an inert hydrocarbon, such as one of the type used as a wash liquid, and then to remove that liquid using a vacuum. In such a process it is sometimes desirable to subject the resulting mixture to sonification before stripping off the liquid.

The resulting solid prepolymerized metallocene-containing catalyst system is useful for the polymerization of olefins. Generally, it is not necessary to add any additional aluminoxane to this catalyst system. In some cases it may be found desirable to employ small amounts of an organoaluminum compound as a scavenger for poisons. The term organoaluminum compounds include compounds such as triethylaluminum, trimethylaluminum, diethylaluminum chloride, ethylaluminum dichloride, ethylaluminum sesquichloride, and the like. Trialkylaluminum compounds are currently preferred. Also in some applications it may be desirable to employ small amounts of antistatic agents which assist in preventing the agglomeration of polymer particles during polymerization. Still further, when the inventive catalyst system is added to a reactor as a slurry in a liquid, it is sometimes desirable to add a particulate dried solid as a flow aid for the slurry. Preferably the solid has been dried using one of the methods described earlier. Inorganic oxides such as silica are particularly preferred. Currently, it is preferred to use a fumed silica such as that sold under the tradename Cab-o-sil. Generally the fumed silica is dried using heat and trimethylaluminum.

The solid catalyst system is particularly useful for the polymerization of alpha-olefins having 2 to 10 carbon atoms. Examples of such olefins include ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, styrene, and the like and mixtures thereof. The catalysts are also useful for preparing copolymers of ethylene and propylene and terpolymers of ethylene and propylene and a higher molecular weight olefin. The catalysts are particularly useful for preparing copolymers having ethyl branches without the use of any added comonomer.

The polymerizations can be carried out under a wide range of conditions depending upon the particular metallocene employed and the particular results desired. Although the inventive catalyst system is a solid, it is considered that it is useful for polymerization conducted under solution, slurry, or gas phase reaction conditions.

When the polymerizations are carried out in the presence of liquid diluents obviously it is important to use diluents which do not have an adverse effect upon the catalyst system. Typical liquid diluents include propane, butane, isobutane, pentane, hexane, heptane, octane, cyclohexane, methylcyclohexane, toluene, xylene, and the like. Typically the polymerization temperature can vary over a wide range, temperatures typically would be in a range of about −60° C. to about 300° C., more preferably in the range of about 20° C. to about 160° C. Typically the pressure of the polymerization would be in the range of from about 1 to about 500 atmospheres or even greater. The inventive catalyst system is particularly useful for polymerizations carried out under particle form, i.e., slurry-type polymerization conditions.

The polymers produced with this invention have a wide range of uses that will be apparent to those skilled in the art from the physical properties of the respective polymers. Applications such as molding, films, adhesives, and the like are indicated. The polymers are particularly unusual in that molar percent of ethyl branches is substantially the same for molecular fractions across the molecular weight distribution. This can be determined by subjecting the polymer to Solvent Gradient Fractionation (SGF) to obtain fractions having very narrow molecular weight distribution and then determining the mole percent of ethyl branches in the polymers of the various fractions using $C^{13}$NMR.

Of particular interest are the polymers in which the mole percent of ethyl branches in the various molecular fractions obtained by SGF differ by no more than about 0.09 mole percent across the molecular weight distribution. Preferably, the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the Mz of the polymer is less than about 0.06 mole percent. Still more preferably the difference between mole percent of ethyl branches in a molecular fraction obtained by SGF which has a weight average molecular weight about equal to the $M_n$ of the polymer and the mole percent of ethyl branches in a molecular fraction obtained by SGF which has a weight average molecular weight about equal to the $M_w$ of the polymer is less than about 0.02 mole percent. (The phrase "about equal" as used in this paragraph means that the weight average molecular weight of the fraction is within 5 percent of the referenced item, e.g. within 5% of the Mz of the polymer, for example. More preferably, the phrase means within 2%.)

Also included within the scope of the invention are polymers of ethylene having a SGF fraction with MWD in the range of 1 to 1.5, a weight average molecular weight greater than the weight average molecular weight of the polymer, and a mole percent of ethyl branches within 0.06 mole percent of the mole percent of ethyl branches of the polymer. Also included are polymers having a SGF fraction with MWD in the range of 1 to 1.5, a weight average molecular weight about two times greater than the weight average molecular weight of the polymer, and a mole percent of ethyl branches within 0.04 mole percent of the mole percent of ethyl branches of a SGF fraction of the polymer having a MWD in the range of 1 to 1.5 and a weight average molecular weight of about one tenth of the weight average molecular weight of the polymer. Also included are polymers having a SGF fraction with MWD in the range of 1 to 1.5, a weight average molecular weight at least about two times greater than the weight average molecular weight of the polymer, and a mole percent of ethyl branches within 0.04 mole percent of the mole percent of ethyl branches of a SGF fraction of the polymer having a MWD in the range of 1 to 1.5 and a weight average molecular weight of no more than about 10,000.

A particularly preferred embodiment includes polyethylenes in which the molar percent of ethyl branches of fractions obtained by conducting Temperature Gradient Fractionation (TGF) on the SGF fractions is also substantially the same across the molecular weight distribution of the SGF fraction.

Ethylene polymers of the present invention include those which have a narrow molecular weight distribution, i.e. a MWD in the range of about 1.5 to about 3, more typically in the range of about 2 to about 3, which are generally monomodal and generally have only one peak in their DSC curve. The inventive polymers thus include those having a melting point in the range of about 100° C. to about 140° C.

The molecular weight of the polymers can vary over a wide range, for example $M_w$'s in the range of 10,000 to 1,000,000 or more. The melt index of the polymers can also vary over a wide range. Inventive polymers having MI's in the range of about 0.01 to about 500 dg/min. are of particular interest, with those having MI's in the range of about 0.1 to about 20 dg/min. being especially useful in some applications, such as films.

If one prepares the polymers using only ethylene it is possible to obtain polymers having ethyl branches but no NMR detectable amounts of any larger branches. By using comonomers one can also introduce longer branches in addition to the ethyl branches. One preferred type of inventive polymer has no substantial amounts of long chain branches, i.e. branches having 6 or more carbon atoms. The inventive polymers thus include those in which the number of long chain branches per 1000 carbon atoms is less than 1, more preferably less than 0.2 per 1000 carbons. In especially preferred embodiments the number of such long chain branches is less than 0.01/1000 carbon atoms. Such polymers are characterized by rheological properties quite different than those of polymer having larger amounts of detectable long chain branching. Thus some of the inventive polyethylenes have flow activation energies of less than 25 kJ/mole and critical shear stress at the onset of melt fracture of less than $4 \times 10^6$ dyne/cm$^2$.

A further understanding of the present invention, its various aspects, objects and advantages will be provided by the following examples.

In the discussion which follows various polymer properties will be discussed. For the purposes of this disclosure unless indicated otherwise the properties were determined as follows: density in grams/mL (ASTM D1505-68); Tm in degrees Celsius by ASTM D1693, High Load Melt Index (HLMI) in grams of polymer/10 minutes at 190° C. (ASTM D1238-86, Condition 190/21.6); Melt Index (MI) in grams of polymer/10 minutes at 190° C. (ASTM D1238-86, Condition 190/2.16); Shear Stress Response (SR) determined by dividing HLMI by MI; Molecular weights and Molecular Weight Distribution by size exclusion chromatography, i.e. weight average molecular weight referred to herein as $M_w$, and number average molecular weight referred to herein as $M_n$; and Heterogenity index (HI) or Polydispersibility (PD) or molecular weight distribution (MWD) being determined by dividing $M_w$ by $M_n$. The (SEC) size exclusion chromatography was conducted using a linear set of GPC/SEC columns capable of resolving a wide range of molecular weights generally observed in polyolefins, such as polyethylene.

The content of methyl branches, ethyl branches, and the like was determined using the technique described in "Carbon 13 NMR In Polymer Quantitative Analysis" by J. C. Randall and E. T. Hsieh, Chapter 9, ACS Monograph No. 247, 1983. a method of determining long chain branching is disclosed in Randall, *Rev. Macromol. Chem. Phys.*, C29 (243), 285,297. The C$^{13}$NMR data were obtained using a Varian Unity 500 instrument. The carbon-13 spectral frequency was 125,699 MHZ. The instrument conditions were: probe temperature, 125° C.; broadband decoupling: pulse angle, 90°; pulse delay, 12 seconds; acquisition time, 3 seconds; spectral width, 8000 Hz; data points per spectrum, 48 K; double precision arithmetic; 5500 to 6000 transients per spectrum, corresponding to a signal-to-noise ratio of approximately 5,000 to 1. The probe was a high sensitivity 10 mm broadband probe.

Solvent Gradient Fractionation (SGF) is a technique for separating molecular fractions based upon the solubility of the molecules of different molecular weights in different solvents at a given temperature. Temperature Gradient Fractionation (TGF) is a technique for separating molecular fractions based upon the solubility of the molecules at different temperatures in a given solvent. Conducting a SGF and then subjecting fractions obtained from the SGF to TGF can be referred to as a Cross-Fractionation.

An example of the technique for conducting the cross fractionation will now be described. The fractionation column employed in the fractionations consisted of, from outside in, a thin metal shell, several layers of insulation material, and a jacketed stainless steel inner column packed with glass beads of mesh sizes from 60 to 80. Thermocouples were located near the top, the bottom, and in the middle, inside the inner column for monitoring the actual column temperature. a Lauda bath made by Brinkmann, Model K20, was used to handle the heating, cooling, and circulation of the ethylene glycol used as the heat exchange fluid. The fractionation column had a free volume of about 11 liters.

The procedure employed for SGF in the following examples involved dissolving 115 grams of the polymer in a 50/50 volume mixture of n-butyl cellosolve (BCS) and 1,2,4-trichlorobenzene (TCB) at 130° C. overnight. a proven antioxidant package was added to the solvent and mechanical stirring was minimized in order to minimize polymer chain degradation. The fractionation column was first filled with that solvent and preheated so that it was at the same temperature as the polymer solution. The polymer solution was then charged into the column from the top. The polymer solution was loaded into the mid-section of the column, and this was followed by the addition of 1.5 liters of the solvent so as to leave approximately 1.5 liters of solvent at both ends. At the completion of the loading of the polymer a slow cooling process was begun. The column temperature was decreased linearly from 130 to 80° C. at a rate of 0.5° C. per hour. The cooling rate was lowered to 0.25° C. per hour from 80° to 70° C. Then the column was allowed to cool to 40° C. naturally. The column was usually maintained at the lowest set temperature of this slow cooling step for at least about 24 hours before the polymer recovery was begun.

Then the column was overflushed with 100% BCS. The polymer in the recovered BCS was thus the polymer that remained dissolved in the 50/50 volume percent mixture after the slow cooling process. Then the temperature was increased to 130° C. with elution stops at 80°, 100°, and 130° C. These extra temperature stops with the poorest solvent usually allowed for further extraction of the lowest molecular weight components. After the fraction was taken at 130° C. the column the remaining steps involve elution with solvents having increased levels of TCB with the elutions being conducted at 130° C. The volume percent of TCB in the first step was 5 and it was increased in 5 volume percent increments to 20, and then in 2.25 volume percent increments to 30, and then in 1 volume percent increments to 38, and then in 0.5 volume percent increments to 43.5. Each new step involved replacement of the solution inside the column from the previous step with the fresh solvent of the next level of TCB. The displaced solvent would be the second wash of the previous step. The column was then allowed to equilibrate at the set temperature of 130° C. overnight with no solvent flow. Then fresh solvent of the same composition would be introduced for the second time the next morning, until the column was completely filled with fresh solvent. The displaced solvent would be the first wash of that step. The solutions from the two washes in each step were combined, cooled, mixed with twice the volume of acetone and filtered. The resulting polymer precipitate was then dried in a vacuum oven at 40° C. and weighed and then submitted for GPC and NMR analysis. At the end of the polymer recovery steps the column was thoroughly washed with pure TCB at 140° C. and any polymer recovered was similarly separated and submitted for GPC and NMR analysis.

A TGF of an SGF fraction can be carried out by dissolving 6 grams of the polymer of the SGF fraction in 800 mLs of pure TCB at 130° C. The polymer is loaded onto a column having a free volume of 1.1 liter. In this case only one wash need be used for each step which uses 1.4 liters of fresh TCB. a total of 24 hours of thermal equilibration would be used at each set temperature for each step, including the time needed for the wash. Elutions would be performed at temperatures of 40°, 45°, 48°, 50°, 53°, 55°, 58°, 60°, 63°, 65°, 68°, 72°, 87°, and 140° C. The polymer in the various fractions would be recovered and submitted for GPC and NMR analysis.

EXAMPLE I

An inventive catalyst system was prepared by adding 44 mg of metallocene 1-(9-fluorenyl)-1-(1-indenyl)-1-(methyl)-1-(but-3-enyl) methane zirconium dichloride to 10.5 mL of a 10 weight percent toluene solution of aluminoxane. The resulting mixture was stirred for 15 minutes then 2.02 gm of a trimethylaluminum treated Davison 948 silica and 12 mL of toluene was combined with the metallocene/aluminoxane mixture and stirred for 10 minutes. Another 6 mL of toluene was added and the mixture stirred for another 5 minutes. The container was then capped and prepolymerization was conducted by injecting ethylene at 4 psig into the mixture to obtain a weight gain of 1.7 gm. The resulting solid was filtered and rinsed with toluene and then filtered again. That solid was again washed first with toluene and then with hexane and filtered. The hexane wash was repeated and the solid recovered by filtering. The solid was then subjected to high vacuum for 1 ½ hours.

This resulting prepolymerized catalyst system was then employed in the homopolymerization of ethylene in an autoclave containing 2 liters of isobutane. The polymerization was conducted at 90° C. Ethylene was the only monomer added. The resulting polymer had a density of 0.938 gm/cm$^2$ and a $M_w$ of 105,000 and a $M_n$ of 44,900 for a HI of 2.3. NMR analysis on the polymer indicates that it had 0.34 mole percent ethyl branches. This is significantly higher than the mole percent ethyl branches that were obtained with a similar catalyst system prepared using the metallocene 1-(9-fluorenyl)-1-(cyclopentadienyl) 1-(but-3-enyl)-1-(methyl) methane zirconium dichloride.

That which is claimed is:

1. A process of polymerizing an olefin comprising contacting said olefin under suitable polymerization conditions with a solid metallocene-containing catalyst system produced by combining (a) an organoaluminoxane and at least one bridged metallocene having an indenyl radical bonded to a fluorenyl radical by bridging group having at least one olefinically unsaturated substituent, said metallocene being a metallocene of metals selected from the group consisting of IVB of the Periodic Table, in a liquid to form a liquid catalyst system, (b) conducting prepolymerization of at least one olefin in the presence of said liquid catalyst system to produce a prepolymerized solid catalyst, and (c) separating the solid from the liquid and the components dissolved in said liquid.

2. A process according to claim 1 wherein the polymerization is conducted under slurry polymerization conditions.

3. A process according to claim 2 wherein ethylene is polymerized in the presence of an alkane liquid diluent.

4. A process according to claim 3 wherein said solid metallocene-containing catalyst system is prepared from 5-(9-fluorenyl)-5-(1-indenyl)-hexene-1 zirconium dichloride.

5. A process according to claim 4 wherein the polymerization is conducted in a continuous loop reactor and isobutane is used as a liquid diluent for the polymerization.

6. A process according to claim 5 wherein the solid metallocene-containing catalyst system used in the polymerization is prepared by (a) combining 5-(9-fluorenyl)-5-(1-indenyl)-hexene-1 zirconium dichloride and methylaluminoxane in a liquid, (b) prepolymerizing ethylene in the resulting liquid, in the presence of silica, and (c) separating the resulting solid from the liquid.

7. A process according to claim 6 wherein the liquid used in step (a) consists essentially of an aromatic liquid.

8. A process according to claim 3 wherein R is 1-hexene and the indenyl and fluorenyl are connected to the metallocene at the 5 position of the 1-hexene.

9. A process according to claim 8 wherein ethylene is employed in the absence of added comonomer.

10. A polyethylene produced by the process of claim 9.

11. A self supporting film produced from the polyethylene of claim 10.

* * * * *